March 6, 1945. E. WOMBLE 2,371,011
POWER PLANT
Filed Feb. 26, 1944 3 Sheets-Sheet 1

INVENTOR.
Ewing Womble
BY
ATTY.

March 6, 1945. E. WOMBLE 2,371,011
POWER PLANT
Filed Feb. 26, 1944 3 Sheets-Sheet 3

INVENTOR.
Ewing Womble
BY
ATTY.

Patented Mar. 6, 1945

2,371,011

UNITED STATES PATENT OFFICE 2,371,011

POWER PLANT

Ewing Womble, Memphis, Tenn., assignor to Lewis Supply Company, Memphis, Tenn., a corporation of Tennessee Application February 26, 1944, Serial No. 524,139

5 Claims. (Cl. 290—1)

This invention relates to improvements in portable power plants, and has particular reference to a portable plant which includes a prime mover, a self-contained electric generator and exciter, and a power take-off of mechanical type.

In many instances, need has been found for a mechanical power take-off operable at the same time the generator is delivering electric current, or independently of such current delivery, but heretofore the difficulties of construction, caused in part by the exciter, have introduced obstacles which have seemed insurmountable. And, where such mechanical power take-off has been attempted, its constant operation, particularly where use is not being made of such operation, has been found a source of danger; and where damage to the generator has required repair, abandonment of the entire outfit until such repairs thereto could be effected, has been necessary, even though use of the mechanical take-off during such time might have been much desired.

The primary objects of the invention are:

To provide a self-contained power plant for the generation and delivery of electric current, and the delivery mechanically of power;

To provide such a plant in which generation and delivery of electric current may be accomplished independently of mechanical delivery of power, and mechanical delivery accomplished independently of delivery of electrical power, or both may be concurrently accomplished;

To provide such a plant in which the electric generating unit and the mechanical power delivery unit respectively, are self-contained and either may be directly operably connected to the power unit;

To provide such a plant in which the mechanical power delivery unit forms a secondary closure for the end of the generator unit;

To provide such a plant which includes a prime mover, preferably of Diesel or other internal combustion engine type; a self-contained electric generator unit including an exciter; and a mechanical power delivery unit including a clutch; in which said mechanical power delivery unit is interchangeably connectable to said generator and said power units; and said generator unit is interposed between said power units; and said generator unit is interposed between said power unit and said mechanical delivery unit and is removable to permit direct connection of said mechanical delivery unit to said power unit; and To provide in such a plant, a generator unit including a casing, a pair of heads disposed within said casing and carried thereby, and bearings carried by said heads, said heads forming with said casing a substantially complete enclosure within which, and between said heads, a generator and an exciter therefor are disposed, said generator and said exciter including a joint shaft journalled in said bearings, and extending oppositely beyond said heads, one end of said shaft being splined for engagement with the power unit, the opposite end of said shaft carrying a clutch member, and said casing at the clutch end of said shaft extending beyond said head and bearing to shield said clutch.

The means by which the foregoing and other objects are accomplished, and the method of their accomplishment, will readily be understood from the following specification upon reference to the accompanying drawings, in which.

Figure 1:
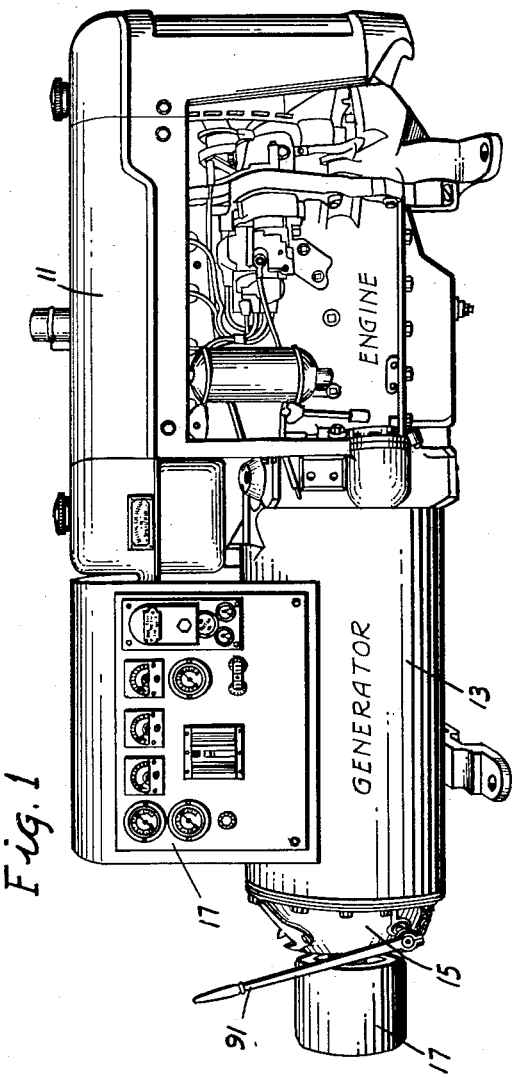
Fig. 1 is a perspective view of the complete power plant.
Figure 2:
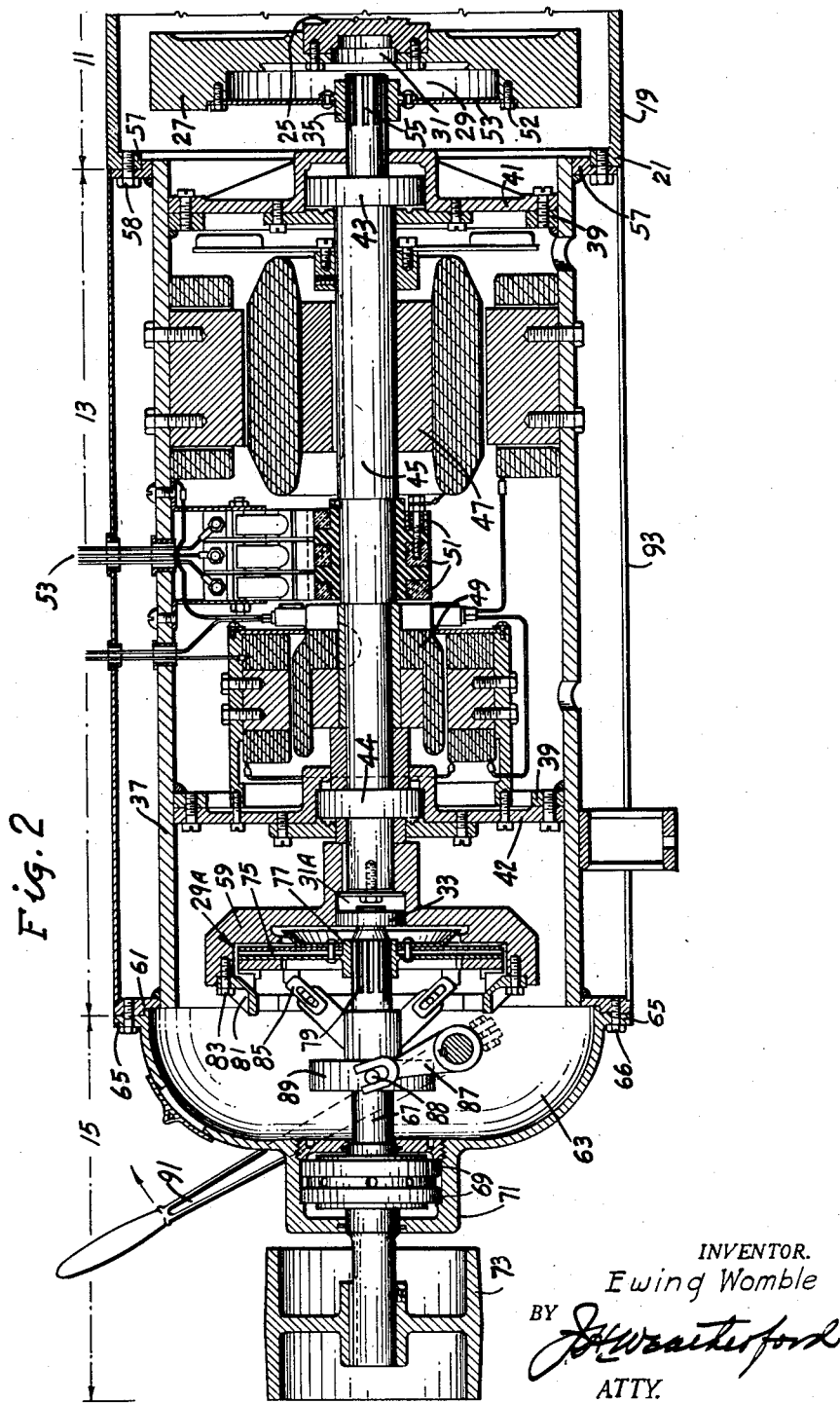
Fig. 2 is a longitudinal section through the generator, and mechanical power take-off units, particularly showing the arrangement and housing of the generator and exciter, and the mechanical power take-off clutch.

In these drawings, and the description hereto attached, the details of the engine or power unit, of the generator and exciter therefor, of the instrument panel and the instruments thereon, and of the belt pulley and clutch are in general of standard type and form no part of the present invention, the invention being in general directed to the positioning and assembling of these parts into an operating unit and particularly the mountings through which the portable plant is effected.

Referring now to the drawings in which the various parts are indicated by numerals:

11 is an internal combustion engine, 13 a generator section or unit, 15 a mechanical power take-off section or unit, and 17 an instrument board mounted on the generator section.

Figure 3:
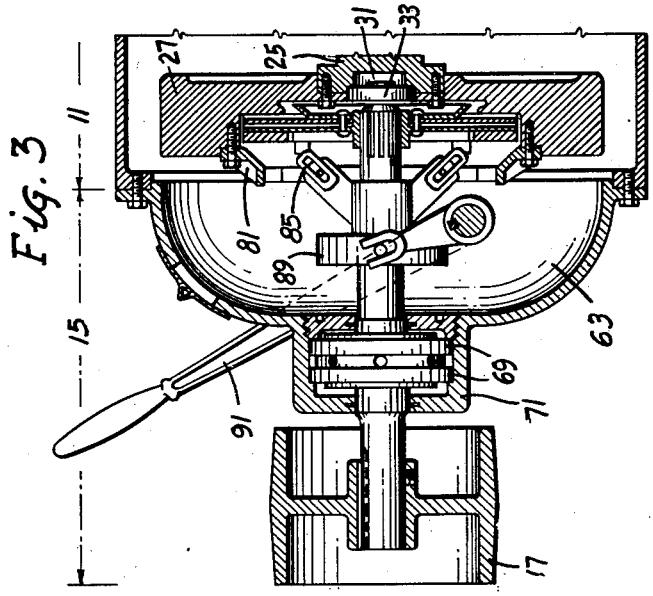
Fig. 3 is a sectional elevation showing the pulley, shaft, and clutch parts and the housing bell of the mechanical power take-off unit, directly carried by the power unit, the generator unit having been removed.
Figure 4:
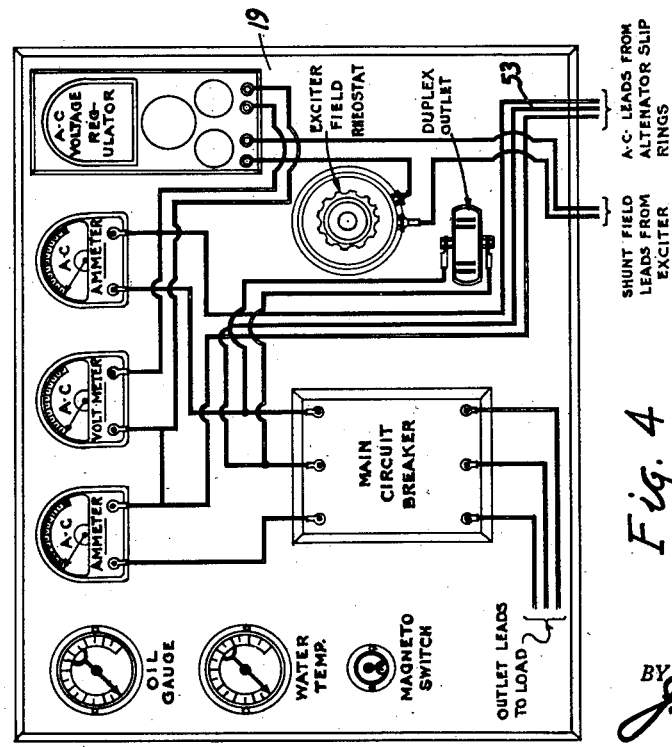
Fig. 4 is an outline view of the arrangement of the instrument board, the instruments thereon being of standard type, and the arrangement of the leads being typical of standard practice.

The engine adjacent the generator section, includes an annular bell housing portion 19 terminating in an annular flange 21, tapped to receive attaching cap screws 58. 25 is the engine shaft to which is secured a fly-wheel 27, the wheel being chambered at 29 to form one member of a standard type of clutch, shown complete in Fig. 3, and being further counter-bored at wi as to receive a bearing race 33 of such clutch. 35 is the hub of a coupling for the generator shaft.

The generator unit 13 comprises a cylindrical casing 37, within which are a pair of annular flanges 39, to which heads 41—42 are secured, as by cap screws. The heads 41—42 seat the outer races 43—44, of ball or roller bearings, which journal the generator shaft 45, the shaft projecting through and beyond both heads of the casing. Mounted on the shaft 45 between the heads and housed by the casing and heads are the rotors 47 and 49 of the generator and the exciter therefor, and the collection rings 51 from which the current generated is led off through leads 53. Also disposed between the heads and housed by the heads and casing are the fields and other parts of the generator and exciter.

At the engine end of the unit the head 41 is positioned closely adjacent the end of the casing and so that the shaft projecting through the bearing 43 extends beyond the end of the casing into the chambered end 29 of the fly-wheel with a minimum of overhang. Secured to the fly-wheel, as by screws 52, is a disc 53 which is carried by the hub 35, the hub and shaft having complementary splines and grooves 55 to accomplish driving engagement.

Rigidly secured to, or integral with, the engine end of the casing 37, is an annular flange 57 which mates with the flange 21 of the engine bell housing and is secured thereto, as by cap screws 58. In securing the generator unit to the engine frame the end of the generator shaft 45 is brought into engagement with the hub 35, and with the shaft so engaged is shifted until the flanges 57 and 21 abut and attachment is made as by means of the cap screws 58.

At the opposite end of the casing the shaft 45 projecting through the bearing 44, carries and drives an annular clutch member 59 which is chambered out at 29A, and 31A, in like manner and in conformity to the chambering of the engine fly-wheel 27, the head 42 being spaced sufficiently inward from the end of the casing, establishing at such end a generator bell housing within which the clutch member 59 is disposed and protected as in the engine fly-wheel. Rigidly secured to, or integral with, and forming part of this housing, is an annular flange 61 which is faced, bored and tapped in conformity with the bore and tapping of the flange 57 of the engine bell housing.

The mechanical power take-off 15, includes a bell housing 63, preferably cup-shaped, and having a ring flange 65, faced and annularly shouldered to mate with the casing flange 61. The housing is secured to the flange 61, as by cap screws 66. 67 is the power take-off shaft, which is journalled in a bearing, preferably of roller type, the outer races 69 of this bearing being carried by a hub portion 71 of the bell housing 63. The shaft 67 projects beyond the bearing and carries and drives a pulley 73 through which power is mechanically delivered. The inner end of the shaft 67 extends beyond the face of the bell housing and is journalled in the bearing 35 carried by the clutch member 59. It is operatively connected to the generator shaft by an usual and well known type of "over center, plate clutch," which includes the clutch member 59, and cooperating discs 75 which are carried by a hub 77 having spline and groove engagement 79 with the shaft. It also includes a support member 81 secured to the clutch member 59 by cap screws 83, which carries linkage 85 which is shifted by a yoke and collar assembly 87, 89, and a clutch lever 91. Cap screws 83 are of same size, and equally spaced on a bolt circle of the same diameter as are the cap screws 52 in the engine fly-wheel, so that support 81 may be interchangeably connectable to the fly-wheel 27, to effect clutch transfer thereto.

Should electric current not be required, all of the power of the engine may be taken off through the power take-off, in such case the generator merely floating on the line and acting as a fly-wheel, and except for minor friction, absorbing no power from the engine.

Should repairs be needed to the generator, or otherwise if proved desirable, the generator and power units may be disconnected and the power-take-off directly coupled to the engine, the engine fly-wheel 27 in such case acting as one member of the clutch assembly. In such case, the support member 81 of the clutch is secured to the fly-wheel as by the cap screws 52, mounting the discs 75, linkage 85, and collar 89 on the fly-wheel as a cooperating clutch member, the shaft 67 is passed through the collar 89 and into spline engagement with the hub and the power take-off bell housing 63 bolted directly to the engine bell housing 19.

Should it be found desirable, the power take-off may be disconnected and removed, by removing the cap screws 66, and removing the bell housing 63 and shaft 67 carried thereby, the shaft withdrawing through the collar assembly 89 and its splined end 79 from the clutch hub 77, and shift of lever 91 permitting disengagement of the yoke 87 from the pins 88. Subsequently the screws 83 may be removed, disconnecting and permitting removal of the support member 81 and the clutch parts carried thereby.

If desired, the generator section may be secondarily covered by a shell 93, preferably in sections, to permit ready removal and access to attaching screws.

It will particularly be noted that in the construction heretofore described the exciter and generator are both mounted within an enclosure formed by the casing 37, and the heads 41—42, the bearings 43 and 44 for the generator and exciter shaft 45, being carried by these heads, and that this housing of the exciter, as well as the generator, within the casing enclosure permits the clutch member 59 to be secured on the outer end of the shaft in close adjacency to one of the bearings 44, eliminating the otherwise substantially impossible overhang necessary had the exciter been mounted outside of the head 42, as well as affording complete housing and protection for the exciter without the necessity of an additional housing structure, such as would otherwise be necessary.

I claim:

1. A portable power plant, including a prime mover, a self-contained electric generator unit, and a mechanical power delivery unit, and in which said prime mover and a first end of said generator unit each respectively includes a bell housing having identically faced, bored and tapped ends, said power delivery unit has a mating end complementary to either of said bell ends, and the second end of said generator unit is of identity with said power delivery end, whereby said generator unit may be secured to said prime mover and said power delivery unit to said generator unit, or said generator unit removed and said power delivery unit coupled directly to said prime mover.

2. A portable power plant comprising a prime mover, a self-contained electric generator unit and a mechanical power delivery unit, each respectively including a shaft, and means alining said shafts; said prime mover shaft terminating in a coupling member, said generator shaft terminating at one end in a first coupling member complementary to said prime mover coupling member, and means detachably securing said coupling member together, said generator shaft having at its opposite end a second coupling member identical with said prime mover member, and said power delivery shaft a clutch assembly complementary to said second generator coupling member, and including related parts detachably secured to said generator member to complete a clutch, said generator unit being removable and said clutch assembly parts securable to said identical prime mover coupling member to complete a like clutch.

3. A portable power plant comprising a prime mover, a self-contained electric generator unit and a mechanical power delivery unit, each respectively including a housing and a shaft, and means securing said housings together and alining said shafts, said prime mover shaft terminating in a coupling member, said generator shaft terminating at one end in a first coupling member complementary to said prime mover coupling member, and means securing said coupling members together, said generator shaft having at its opposite end a second coupling member identical with said prime mover member, and said power delivery shaft a clutch assembly complementary to said second generator coupling member, and including related parts secured to said generator member to complete a clutch.

4. A portable power plant comprising a prime mover, a self-contained electric generator unit and a mechanical power delivery unit, each respectively including a housing and a shaft, and means detachably securing said housings together and alining said shafts, said prime mover shaft terminating at one end in a first coupling member complementary to said prime mover coupling member, and means detachably securing said coupling members together, said generator shaft having at its opposite end a second coupling member identical with said prime mover member, and said power delivery shaft a clutch assembly complementary to said second generator coupling member, and including related parts detachably secured to said generator member to complete a clutch, said generator unit being removable by detachment of said housing securing means, said power delivery housing securable to said prime mover housing, and said clutch assembly parts securable to said prime mover coupling member to complete a like clutch.

5. In a portable power plant, including a prime mover, having a shaft and a bell housing; a generator unit including a cylindrical barrel coupled to said bell housing, in axial alinement with said shaft, a pair of heads spaced apart within said barrel, to establish a chamber, one of said heads being spaced from an end of said barrel to establish a bell housing exterior to said chamber, a shaft alined with said prime mover shaft, concentric with said barrel, and journalled in said heads, said shaft extending beyond said heads, a clutch member disposed within said bell housing, and mounted on the shaft end extending thereinto, and a coupling member on the opposite end of said shaft operatively coupled to said prime mover shaft, a generator, collector rings and an exciter housed within said chamber, said collector rings and the rotors of said generator and said exciter being carried by said shaft.

EWING WOMBLE.